(12) United States Patent
Kubsch et al.

(10) Patent No.: US 7,382,964 B2
(45) Date of Patent: Jun. 3, 2008

(54) DIGITAL VIDEO RECORDER AND METHODS FOR DIGITAL RECORDING

(75) Inventors: Stefan Kubsch, Hohnhorst (DE); Marco Winter, Hannover (DE); Dirk Adolph, Ronnenberg (DE)

(73) Assignee: Thomson Licensing, Boulogne-Billancourt (FR)

( * ) Notice: Subject to any disclaimer, the term of this patent is extended or adjusted under 35 U.S.C. 154(b) by 1295 days.

(21) Appl. No.: 10/278,192

(22) Filed: Oct. 22, 2002

(65) Prior Publication Data

US 2003/0091337 A1     May 15, 2003

(30) Foreign Application Priority Data

Nov. 14, 2001    (EP) ................................. 01127015

(51) Int. Cl.
*H04N 5/91*    (2006.01)
(52) U.S. Cl. .......................................... 386/46; 95/109
(58) Field of Classification Search ................. 386/46, 386/68, 70, 95, 109–111, 125, 126; 707/100–103; 70/203
See application file for complete search history.

(56) References Cited

U.S. PATENT DOCUMENTS 6,289,169 B1    9/2001  Okuyama

| 6,925,247 B2 * | 8/2005 | Kim et al. ..................... 386/68 |
| 7,200,601 B1 * | 4/2007 | Bradley et al. ............. 707/100 |
| 7,228,560 B2 * | 6/2007 | Panabaker .................. 725/114 |

FOREIGN PATENT DOCUMENTS

| EP | 1111916 A | 6/2001 |
| WO | WO00/57895 | 10/2000 |
| WO | 0176241 A | 10/2001 |

OTHER PUBLICATIONS

European Search Report

\* cited by examiner

*Primary Examiner*—Thai Tran
*Assistant Examiner*—Mishawn Dunn
(74) *Attorney, Agent, or Firm*—Joseph J. Laks; Robert B. Levy; Jorge T. Villabon (57) ABSTRACT

The present invention relates to a digital audio and/or video recorder and to a method for recording of program data comprised in a transport stream, the transport stream having metadata, the method comprising the steps of:

de-multiplexing the transport stream to provide the program data and the metadata, storing the program data in a digital recording format, the digital recording format having a first data structure for storing of navigation data and a second data structure of a second stream format for storage of program data packets, transforming the metadata into the first data structure, and storing the transformed metadata as part of the navigation data.

13 Claims, 7 Drawing Sheets

| Descriptor | Tag value | NIT | BAT | SDT | EIT | TOT | PMT | SIT (note 1) |
|---|---|---|---|---|---|---|---|---|
| network_name_descriptor | 0x40 | * | - | - | - | - | - | - |
| service_list_descriptor | 0x41 | * | * | - | - | - | - | - |
| stuffing_descriptor | 0x42 | * | * | * | * | - | - | * |
| satellite_delivery_system_descriptor | 0x43 | * | - | - | - | - | - | - |
| cable_delivery_system_descriptor | 0x44 | * | - | - | - | - | - | - |
| reserved for future use | 0x45 | - | - | - | - | - | - | - |
| reserved for future use | 0x46 | - | - | - | - | - | - | - |
| bouquet_name_descriptor | 0x47 | - | * | * | - | - | - | * |
| service_descriptor | 0x48 | - | - | * | - | - | - | * |
| country_availability_descriptor | 0x49 | - | * | * | - | - | - | * |
| linkage_descriptor | 0x4A | * | * | * | * | - | - | * |
| NVOD_reference_descriptor | 0x4B | - | - | * | - | - | - | * |
| time_shifted_service_descriptor | 0x4C | - | - | * | - | - | - | * |
| short_event_descriptor | 0x4D | - | - | - | * | - | - | * |
| extended_event_descriptor | 0x4E | - | - | - | * | - | - | * |
| time_shifted_event_descriptor | 0x4F | - | - | - | * | - | - | * |
| component_descriptor | 0x50 | - | - | - | * | - | - | * |
| mosaic_descriptor | 0x51 | - | - | * | - | - | * | * |
| stream_identifier_descriptor | 0x52 | - | - | - | - | - | * | - |
| CA_identifier_descriptor | 0x53 | - | * | * | * | - | - | * |
| content_descriptor | 0x54 | - | - | - | * | - | - | * |
| parental_rating_descriptor | 0x55 | - | - | - | * | - | - | * |
| teletext_descriptor | 0x56 | - | - | - | - | - | * | - |
| telephone_descriptor | 0x57 | - | - | * | * | - | - | * |
| local_time_offset_descriptor | 0x58 | - | - | - | - | * | - | - |
| subtitling_descriptor | 0x59 | - | - | - | - | - | * | - |
| terrestrial_delivery_system_descriptor | 0x5A | * | - | - | - | - | - | - |
| multilingual_network_name_descriptor | 0x5B | * | - | - | - | - | - | - |
| multilingual_bouquet_name_descriptor | 0x5C | - | * | - | - | - | - | - |
| multilingual_service_name_descriptor | 0x5D | - | - | * | - | - | - | * |
| multilingual_component_descriptor | 0x5E | - | - | - | * | - | - | * |
| private_data_specifier_descriptor | 0x5F | * | * | * | * | - | * | * |
| service_move_descriptor | 0x60 | - | - | - | - | - | * | - |
| short_smoothing_buffer_descriptor | 0x61 | - | - | - | * | - | - | * |
| frequency_list_descriptor | 0x62 | * | - | - | - | - | - | - |
| partial_transport_stream_descriptor | 0x63 | - | - | - | - | - | - | * |
| data_broadcast_descriptor | 0x64 | - | - | * | * | - | - | * |
| CA_system_descriptor (note 2) | 0x65 | - | - | - | - | - | * | - |
| data_broadcast_id_descriptor | 0x66 | - | - | - | - | - | * | - |
| Reserved for future use | 0x67 to 0x7F | | | | | | | |
| user defined | 0x80 to 0xFE | | | | | | | |
| Forbidden | 0xFF | | | | | | | |

NOTE 1: Only found in Partial Transport Streams.
NOTE 2: Reserved for DAVIC/DVB use: DAVIC shall define its use.
\* Possible location.

Fig. 3

Figure 4: vendor specific data

| Syntax | No. of bits | Mnemonic |
|---|---|---|
| vendor_specific_data(){ | | |
|    length | 32 | uimsbf |
|    if ( length != 0 ) | | |
|    { | | |
|       for ( int I=0; I<N; I++) | | |
|          vendor_id | 32 | uimsbf |
|          vendor_model_code | 32 | uimsbf |
|          vendor_specific_data_length | 32 | uimsbf |
|          vendor_specific_data_block | 8*vendor_specific_data_length | |
|       } | | |
|    } | | |
| } | | |

Fig. 4

```
Metadata() {                                      No. of bits    Mnemonic
        descriptor_length                         16             uimsbf
        for (i = 0;i < N; i++) {
                descriptor()
        }
}
```

Fig. 5

|  | No. of bits | Mnemonic |
|---|---|---|
| tansport_packet() { | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_srambling_control | 2 | bslbf |
|     adaption_field_control | 2 | bslbf |
|     continuity_counter | 4 | uimsbf |
|     if (adaption_field_control == '10' \|\| adaption_field_control == '11') { | | |
|         adaption_field | | |
|     } | | |
|     if (adaption_field_control == '10' \|\| adaption_field_control == '11') { | | |
|         for (i = 0; i < N; i++) { | | |
|             data_byte | 8 | bslbf |
|         } | | |
|     } | | |
| } | | |

Fig. 6

|  | No. of bits | Mnemonic |
|---|---|---|
| pid_descriptor() { | | |
|     descriptor_tag | 8 | uimsbf |
|     descriptor_length | 8 | uimsbf |
|     reserved | 3 | bslbf |
|     metadata_pid | 13 | uimsbf |
| } | | | descriptor_tag value:     Any value from 0x80 to 0xFE

| Syntax | No. of bits | Mnemonic |
|---|---|---|
| hash_table_descriptor () { | | |
|     descriptor_tag | 8 | uimsbf |
|     descriptor_length | 8 | uimsbf |
|     hash_value | 32 | uimsbf |
| } | | |
|     descriptor_tag value: | Any value from 0x80 to 0xFE | |

Fig. 9

DIGITAL VIDEO RECORDER AND METHODS FOR DIGITAL RECORDING

FIELD OF THE INVENTION

The present invention relates to the field of digital audio and/or video recording, and more particularly to recording of metadata by means of a digital video recorder (DVR).

BACKGROUND OF THE INVENTION

It is as such known from the prior art to include metadata in a transport stream. The term "metadata" is used for all kinds of data about data. This encompasses data which is descriptive about content, such as program title and synopsis. Further the term metadata does also encompass data which relates to the data transmission and/or recording process itself.

For example, the TV-Anytime forum has published metadata specifications which define the attractors and data structures that allow consumers to find, navigate and manage content. The "TV-Anytime" standard is an emerging standard which is defined by the TV-Anytime forum.

Such metadata is also referred to as "attractors" because it can attract a consumer to content. Attractors allow consumers to find, navigate and manage content from various sources. In addition to attractors metadata as defined by TV-Anytime also includes information about user preferences and history. User preference information, such as favorite actors or TV-shows, is included within the scope of TV-Anytime metadata to allow software agents to select content on the consumers behalf.

The metadata representation format is a specification of how TV-Anytime metadata is represented in the extended mark up language (XML). However the TV-Anytime metadata is not restricted to XML can also be encoded in a binary format for transmission or storage. Details of the metadata specification are published in the document SP003V10 of 16 Feb. 2001 which is available on the web-site www.tv-anytime.org. So far no transport mechanism is disclosed for the metadata within the scope of the TV-Anytime specification; also the manner in which the metadata is stored, accessed and used on a personal digital recorder (PDR) is unknown.

Further it is as such known from the prior art to include metadata in a MPEG-2 transport stream. Such transport streams are used for digital video broadcasting. In this instance the metadata is included in the transport stream in the form of digital video broadcast-service information (DVB-SI). The DVB-SI format is described in EN 300 468, DVB Specification for Service Information (SI) in DVB systems.

For the recording of a DVB program by means of a digital video recorder (DVR) a so-called DVR-standard is currently under development. However, a problem associated with the recording of a DVB signal by means of a DVR is that not all program related information (DVB-SI) is stored on the storage medium, e.g. an optical disc. The loss of this descriptive data has serious disadvantages for the DVR operation. Furthermore, the user cannot include user provided data such as annotations or other user provided content into the recording. Finally, the DVR format does not provide for a means to store such information outside the stream for making metadata available for navigation purposes.

SUMMARY OF THE INVENTION

The present invention provides for an improved method for recording of program data comprised in a transport stream, such as MPEG-2, by means of a digital audio and/or video recorder (DVR). Further the invention provides for an improved computer program digital audio and/or video recorder for recording of program data comprised in such a transport stream.

The invention enables to include metadata provided by the transport stream into the navigation data of the digital recording. This allows a user to take full advantage of the metadata provided by the broadcasters and/or to include additional metadata, such as user provider annotations and/or data from other sources like the Internet, digital audio broadcast data (DAB) or teletext.

It is a further advantage of the present invention that the metadata information which is stored as part of the navigation data of the digital recording enables a user to use that information for retrieval of recordings and to readily access metadata information.

In accordance with a further preferred embodiment of the invention the metadata is also stored as part of the DVR MPEG-2 transport stream file (MPEG TS). This is done by ingesting of additional data packets into the MPEG TS transport stream.

The additional data packets carry the metadata information. In case the metadata which is stored as part of the navigation data is erased by a user operation or otherwise this metadata can be reconstructed from the additional data packets which are stored as part of the transport stream MPEG TS.

In accordance with a further preferred embodiment of the invention additional data packets are ingested in the MPEG TS transport stream in isochronous intervals. These metadata packets contain hash tables which are calculated during the recording.

A hash table is a checksum or a CRC (Cyclic Redundancy Check) and provides consistency checks after recording. The check is done by recalculating the hash table metadata during playback and comparing it to the hash tables comprised in the additional data packets of the transport stream.

In accordance with a further preferred embodiment of the invention additional metadata packets are provided for trick modes. Metadata packets embedded within the MPEG TS transport stream are carrying pointers to adjacent entry points for I-frames. For example the trick mode metadata packets encompass a list of past and/or future I-frames. This simplifies handling of the trick mode.

BRIEF DESCRIPTION OF THE DRAWINGS

In the following preferred embodiment of the invention will be explained in greater detail by making reference to the drawings in which:

FIG. 3 is a table of possible locations of descriptors.

DETAILED DESCRIPTION OF PREFERRED EMBODIMENTS

Figure 1:
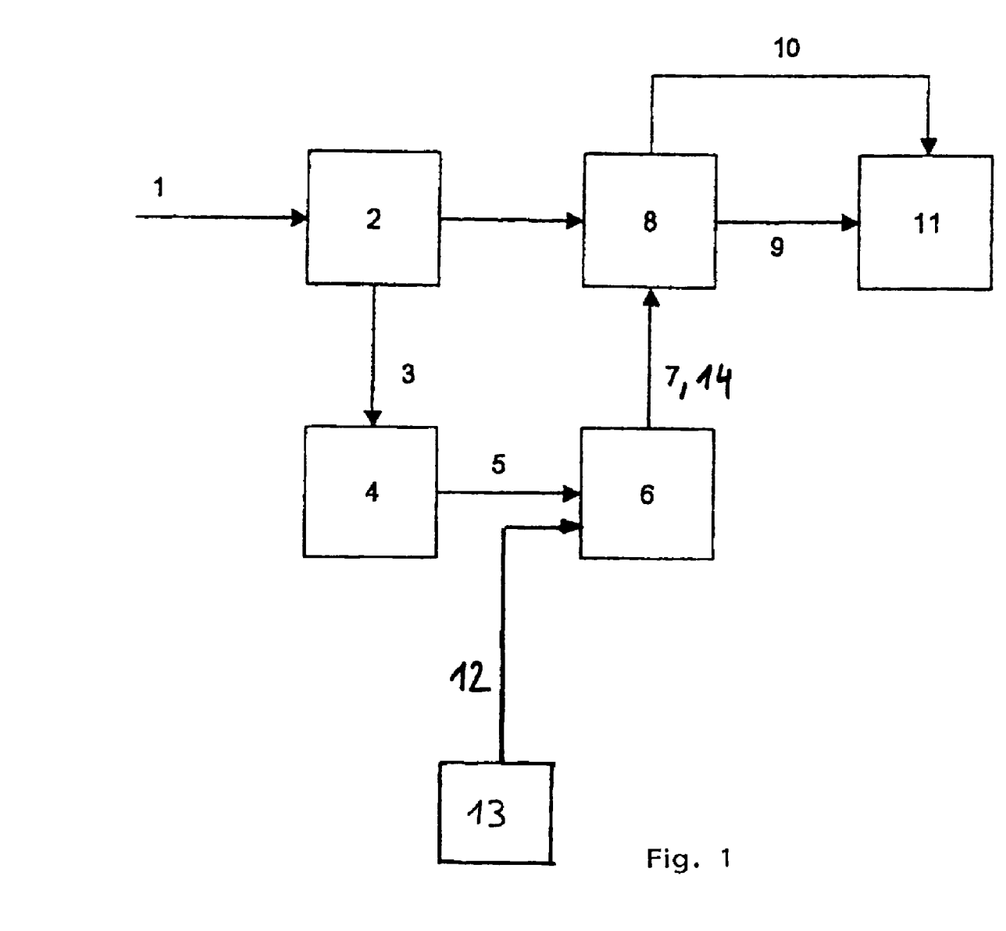
FIG. 1 is a block diagram of an embodiment of a digital video recorder in accordance with the invention.

FIG. 1 shows a block diagram of a digital video recorder. The digital video recorder has demultiplexer 2 for receiving a transport stream, such as a MPEG-2 transport stream 1.

The demultiplexer 2 is coupled to DVR encoder 8. Further the demultiplexer 2 is coupled to analyser 4. The demulitplexer 2 serves to de-multiplex the transport stream 1 in order to provide the required program data to the DVR encoder 8 and to provide DVB-SI data 3 which is embedded in the transport stream 1 to the analyser 4.

The analyser 4 serves to decode the DVB-SI data 3 in order to provide metadata 5 to navigation data and packet embedder 6.

In addition or alternatively other metadata 12 is provided to the navigation data and packet embedder 6 from data source 13. Data source 13 can be an entry device for user provided metadata such as annotations. Alternatively data source 13 provides for an interface to teletext metadata and/or metadata received via digital audio broadcast (DAB) or the Internet.

The navigation data and packet embedder 6 provides for metadata in the form of vendor specific data 7 and for data transport packets 14 to be ingested into the recorded stream.

The vendor specific data 7 and the data transport packets 14 are in putted into the DVR encoder 8. Based on the program data which the DVR encoder receives from the demultiplexer 2 and based on the vendor specific data 7 and the data transport packets 14 the DVR encoder generates a data stream 9 and navigation data 10.

The data stream 9 comprises the additional data transport packets 14 provided by the navigation data and packet embedder 6 whereas the navigation data 10 comprises the vendor specific data 7 from the navigation data and packet embedder 6. The data stream 9 and the navigation data 10 are recorded on DVR disc 11.

In operation a transport stream 1 is received by means of a satellite or cable transmission or via another communication channel. The transport stream 1 comprises a number of video and/or audio programs as well as associated DVB-SI data 3.

The user selects one or more of the programs contained in the transport stream 1 for recording. The corresponding program data packets are provided from the demultiplexer 2 to the DVR encoder 8.

The DVB-SI data 3 which is associated with the user selected programs is also demultiplexed and provided to the analyser 4 for decoding. The analyser 4 outputs the decoded metadata 5.

The navigation data and packet embedder 6 transforms this metadata into vendor specific data 7 and into data transport packets and provides these two formats of transformed metadata to the DVR encoder 8.

This way the DVR encoder 8 integrates the vendor specific data 7 into the navigation data and it ingests the additional data transport packets 14 into the data stream 9 for recording. As a result the recording on the DVR disc 11 contains the metadata both in the form of additional data transport packets 14 as well as in the form of navigation data 10.

The navigation data 10 is primarily used for navigation purposes, such as retrieval of a specific user desired program. As metadata is included in the navigation data 10 the user is enabled to define a search profile which encompasses information stored in the metadata. This has the further advantage that the navigation data 10 can be accessed quickly such that a search is performed very rapidly.

In case the metadata comprised in the navigation data 10 is erased for some reason it can be reconstructed by means of the additional data transport packets 14 which have been ingested into the data stream 9.

Figure 2:
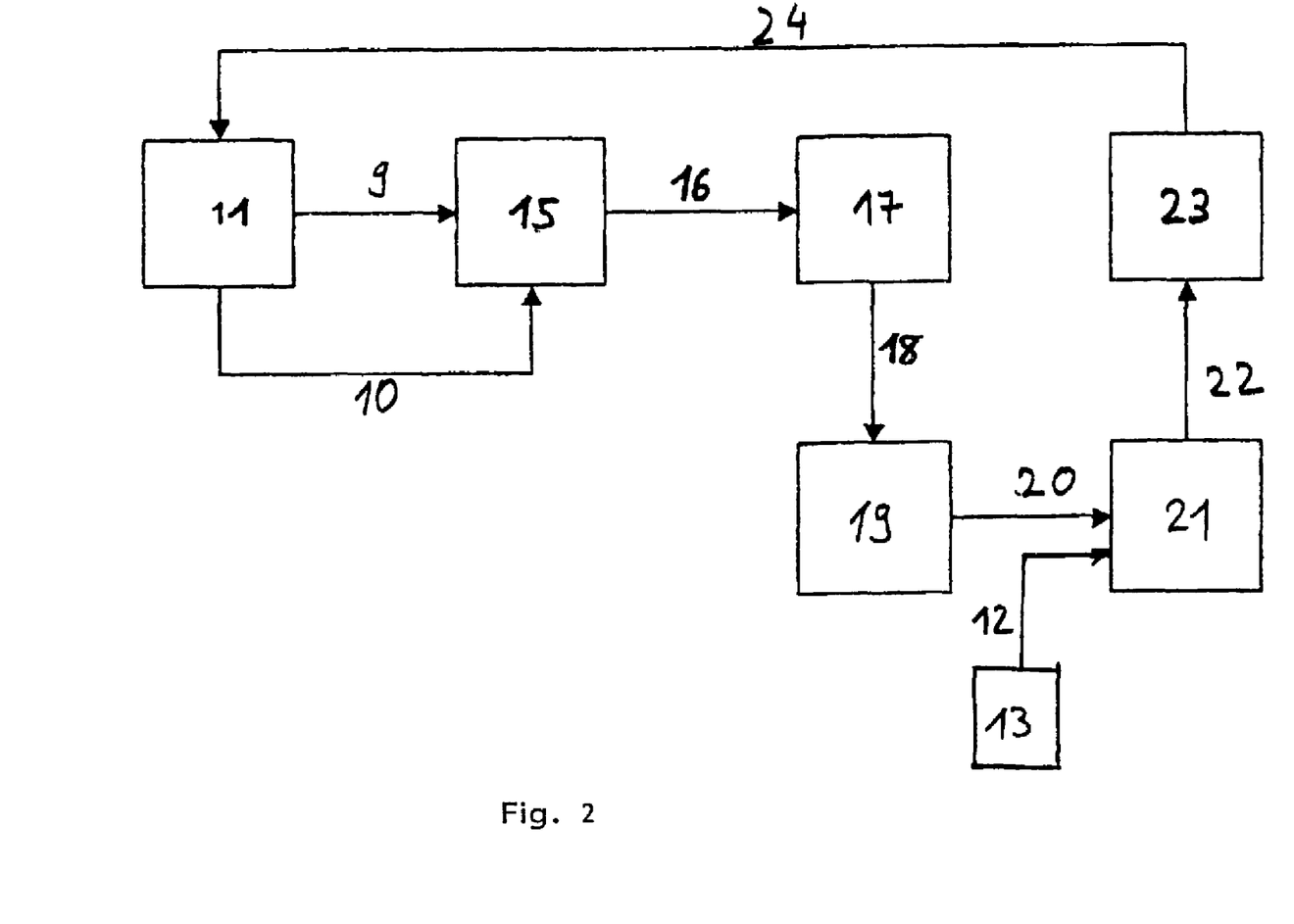
FIG. 2 is a second embodiment of a digital video recorder which enables to add metadata to previous recordings.

FIG. 2 shows a block diagram of another embodiment of a digital video recorder in accordance with the invention. Elements of FIG. 2 which correspond to elements of the embodiment of FIG. 1 are designated by the same reference numerals.

The DVR of FIG. 2 has a DVR decoder 15 which receives a data stream 9 from DVR disc 11 as well as navigation data 10. The DVR disc 11 may contain metadata as described above with reference to FIG. 1. It may also not contain such metadata, especially if the recording has been done previously by means of a prior art DVR.

The DVR decoder 15 outputs a MPEG-2 transport stream 16 which is inputted into demultiplexer 17. The demultiplexer 17 demultiplexes DVB-SI data 18 which is contained in the transport stream 16. The DVB-SI data 18 is inputted into analyser 19.

The analyser 19 decodes the DVB-SI data 18 and provides corresponding metadata 20 to navigation data embedder 21 in addition or alternatively metadata is provided from data source 13 as it is the case in the embodiment of FIG. 1.

The navigation data embedder 21 transforms the metadata 12 and/or metadata 20 into vendor specific data 22. The vendor specific data 22 is provided to the DVR encoder 23 which generates modified navigation data 24 comprising the metadata 12 and/or 20 in the form vendor specific data 22. The modified navigation data 24 is written onto the DVR disc 11.

This way a user is enabled to add navigation data in the form of metadata to a previous recording. This feature is especially advantageous for recordings which have been made previously on a prior art DVR. In such recordings the DVB-SI data 18 may have been recorded as part of the transport stream. However such recorded DVB-SI data is not accessible by a user of a prior art DVR and cannot be used for navigation purposes. By means of the embodiment of FIG. 2 a user is enabled to transform such DVB-SI data into usable navigation data and/or to add additional metadata.

This way data packets are embedded into the DVR vendor specific data field and into the DVR MPEG-2 transport stream (MPEG TS). Both types of embedded packets can be used separately or in combination. For example vendor specific data packets can be used to locate the additional metadata packets in the MPEG TS transport stream and the packets in the MPEG-2 transport stream can be used to generate the vendor specific data metadata packets.

FIG. 3 shows a table listing valid descriptors for DVB-SI metadata packets. In accordance with the invention metadata is transformed into the vendor specific data format of FIG. 4, which is a container format for these metadata.

Figure 4:
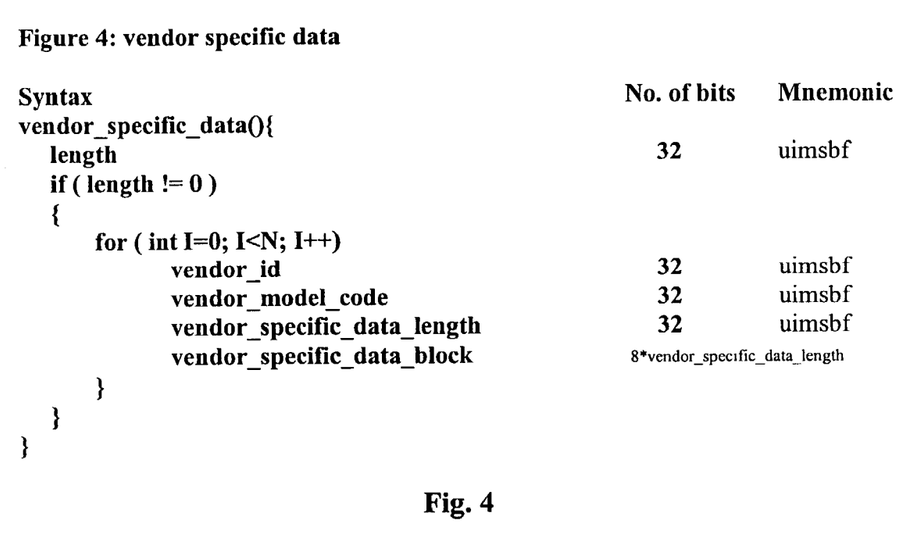
FIG. 4 is illustrative of the vendor specific data syntax.
Figure 5:
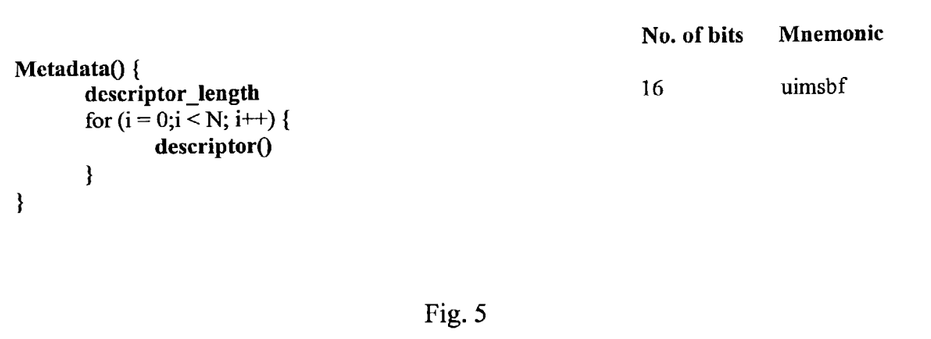
FIG. 5 is illustrative of a metadata packet syntax.

In accordance with the preferred embodiment of FIG. 5 this is done by transforming the metadata from the data structure of FIG. 5 to the data structure of FIG. 4. In the data structure of FIG. 5 descriptor$_{13}$ length designates the total length of the metadata descriptors which is followed by a list of the descriptors (cf. FIG. 3)

Vendor specific data are defined for the volume (info file), each playlist and for the files storing the attributes of A/V stream file.

Figure 6:
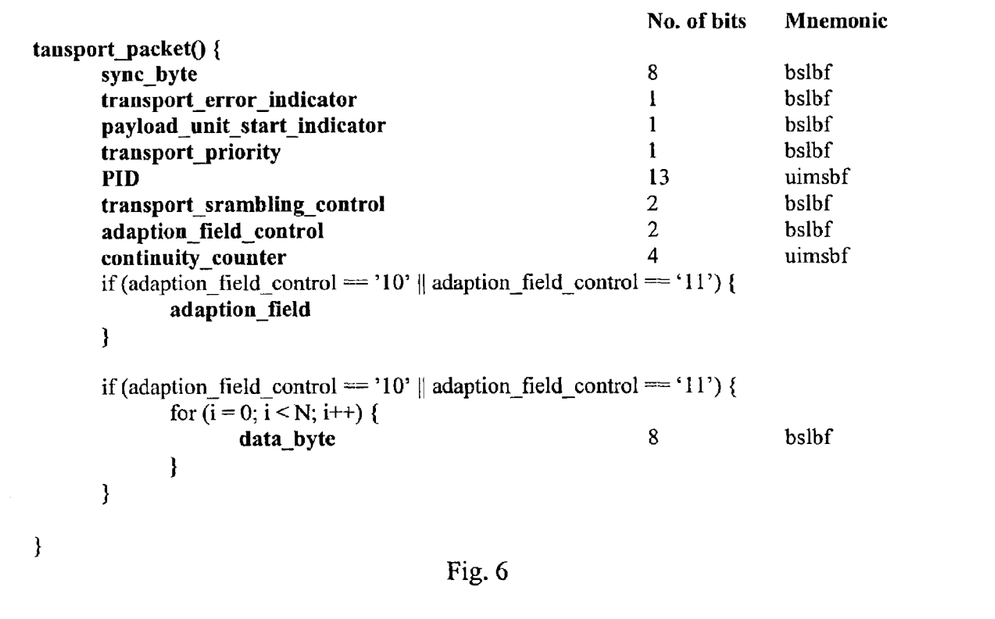
FIG. 6 is illustrative of a transport packet syntax.

A form of metadata packets which is in compliance with the syntax and semantic of a transport packet is illustrated in FIG. 6 and is defined in ISO/IEC 13818-1 MPEG-2 Systems—Generic Coding of Moving Pictures and Associated Audio Information.

Figure 7:
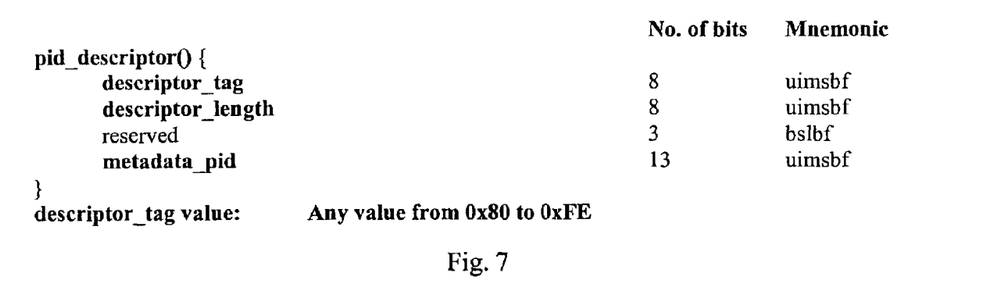
FIG. 7 is illustrative of a packet identifier descriptor syntax.

The packet identifier (PID) of FIG. 5 can have any value in the range of 0x00010-0x1FFE. The PID values chosen for the metadata packets needs to be adapted depending on the PID's already used for audio, video etc. in the MPEG-2 transport stream. Another idea of this invention is to specify the PID of metadata packets by means of a pid_descriptor, which is sorted (see FIG. 7) in the vendor specific data field.

Examples for metadata are DVB-SI information, which has been almost disregarded by the DVR specification (like program genre). Also information retrieved from other sources such as teletext, DAB and internet content carry metadata, which can be embedded within the MPEG TS.

If at the beginning of the recording no payload is existent—this is a further embodiment—placeholder packets are written to the MPEG TS stream. Later theses placeholders can be replaced with valid metadata.

Figure 8:
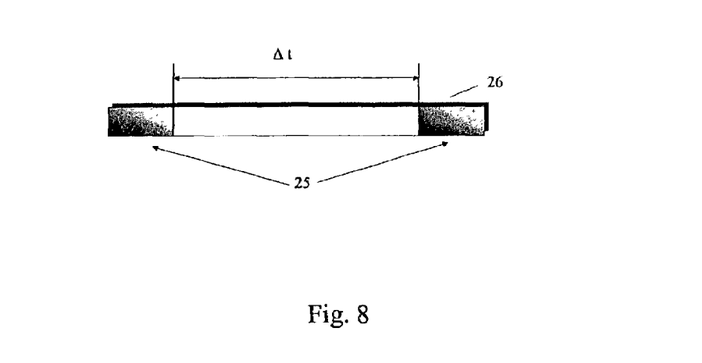
FIG. 8 is illustrative of the format of isochronous metadata packets in a DVR MPEG TS stream.

Another use of the technique is to store metadata packets in isochronous intervals in the MPEG TS stream (FIG. 8). If no payload is available placeholder packets shall be stored. These metadata packets contain hash tables calculated during the recording. A hash table is a check sum or CRC and provides consistency checks after recording. The check is done by recalculation the hash table metadata during playback and comparing it to those located in the stream.

For this purpose additional metadata packets 25 are ingested into the transport stream 26 at time intervals Δt.

By the usage of the hash table metadata packet it is possible to retrieve and also to generate a consistent take even when a power drop occurred during the record in the DVR. A power drop will generate inconsistent DVR files.

Also by the usage of the hash table metadata packet it is possible to detect edit operations having been done by a prior art DVR recorder. For those edited streams a metadata update may be necessary.

Figure 9:
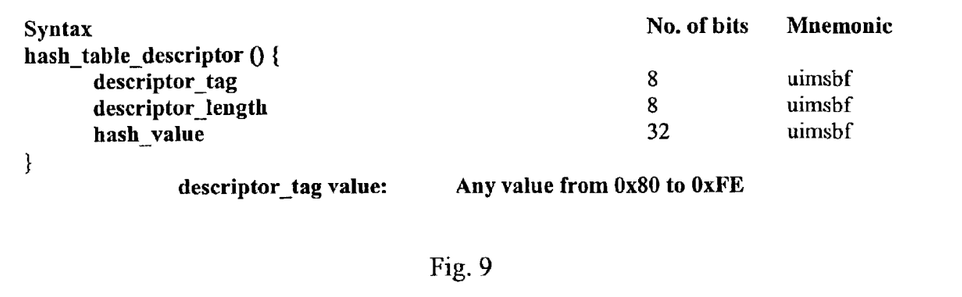
FIG. 9 is illustrative of a hash table descriptor syntax.

By calculating a hash table value for all meaningful DVR files (like the playlist file) edit operations can easily be detected. Even edit operations that have been done with other DVRs can be identified. FIG. 9 shows the appropriate hash_table_descriptor, which is stored in vendor specific data.

It is a further advantage of the invention to provide metadata packets for trick modes. Metadata packets embedded within the bit stream (MPEG TS) are carrying pointers to adjacent entry points for I-frames. The trick mode metadata packets can encompass a list of N I-frames in the past and/or in the future, which will simplify the handling of trick mode.

It is to be noted that the present invention enables the additional storage of metadata content in parallel to the broadcast information which makes all the metadata accessible independent from their definition in the DVR standard. Further the invention provides for editing capabilities for user-defined collections, annotations and short cuts.

By embedding hash tables in the MPEG TS stream the error handling and recovery capabilities of a digital video recorder are improved. Further the invention enables to store adjacent I-picture positions which permits easier trick mode handling.

LIST OF REFERENCE NUMERALS transport stream 1
demultiplexer 2
DVB-SI data 3
analyser 4
metadata 5
navigation data and packet embedder 6
vendor specific data 7
DVR encoder 8
data stream 9
navigation data 10
DVR disc 11
metadata 12
data source 13
data transport packet 14
DVR decoder 15
transport stream 16
demultiplexer 17
DVB-SI data 18
analyser 19
metadata 20
navigation data embedder 21
vendor specific data 22
DVR encoder 23
navigation data 24
metadata packets 25
transport stream 26

What is claimed is:

1. A method for recording of program data comprised in a transport stream, the transport stream having multiple audio/video programs and embedded metadata relating to the audio/video programs, the method comprising the steps of;
   de-multiplexing the transport stream to provide program data and the embedded metadata relating to the program data,
   decoding the embedded metadata to obtain decoded metadata,
   transforming the decoded met data into a container format,
   integrating the decoded metadata transformed into the container format into navigation data,
   storing the program data as a packet-based data stream on a storage medium,
   calculating hash tables during the recording,
   packing the calculated hash tables into data packets, and storing the data packets that contain hash tables within the data stream,
   wherein the hash tables are suitable for enabling a consistency check after recording by recalculating hash tables during playback and comparing the recalculated hash tables to the recorded hash tables, and
   storing the navigation data on the storage medium.

2. The method of claim 1, further comprising the steps of transforming the decoded metadata also into data transport packets, and generating said packet-based data stream from the program data and the data transport packets in a digital recording format.

3. The method of claim 1, further comprising the step of providing additional metadata, wherein the additional metadata are also transformed into said container format and/or said transport packets.

4. The method of claim 3, wherein the additional metadata is provided as user defined metadata and/or teletext data and/or digital audio broadcast data and/or Internet data.

5. The method of claim 1, wherein the data packets that contain hash tables are stored within the data stream in isochronous intervals.

6. The method of claim 1, wherein said metadata comprise metadata for a trick mode.

7. The method of claim 1, wherein the embedded metadata are descriptive metadata describing program content.

8. The method of claim 1, wherein the embedded metadata is digital video broadcast-service information according to the Digital Video Broadcast standard.

9. The method of claim 1, wherein the packet-based data stream has MPEG compliant format.

10. A digital audio and/or video recorder for recording program data comprised in a transport stream, the transport stream having multiple audio and/or video programs and embedded metadata relating to the audio and/or video programs, the recorder comprising:
   means for de-multiplexing the transport stream to provide program data and the embedded metadata relating to the program data,
   means for decoding the embedded metadata to obtain decoded metadata,
   means for transforming the decoded metadata into a container format,
   means for integrating the decoded metadata transformed into the container format into navigation data,
   means for storm the program data as a packet-based data stream on a storage medium,
   means for calculating hash tables during the recording,
   means for packing the calculated hash tables into data packets, and
   means for storing the data packets that contain hash tables within the data stream, wherein the hash tables are suitable for enabling a consistency check after recording by recalculating hash tables during playback and comparing the recalculated hash tables to the recorded hash tables, and
   means for storing the navigation data on the storage medium.

11. Digital audio and/or video recorder according to claim 10, further comprising
   means for transforming the decoded metadata also into data transport packets, and
   means for generating said packet-based data stream from the program data and the data transport packets in a digital recording format.

12. Digital audio and/or video recorder according to claim 10, wherein the data packets that contain hash tables are stored within the data stream in isochronous intervals.

13. Digital audio and/or video recorder according to claim 10, wherein the embedded metadata are descriptive metadata describing program content.

* * * * *